United States Patent
Graham et al.

[11] Patent Number: 5,946,790
[45] Date of Patent: Sep. 7, 1999

[54] PROCESS AND APPARATUS FOR MANUFACTURING CONNECTING RODS

[75] Inventors: John Graham; Johann S. Klimach, both of Clinton Township; Samuel O. Pelto, Macomb, all of Mich.

[73] Assignee: Ex-Cell-O Machine Tools, Inc., Sterling Heights, Mich.

[21] Appl. No.: 08/901,032

[22] Filed: Jul. 25, 1997

Related U.S. Application Data

[60] Provisional application No. 60/039,373, Mar. 20, 1997.

[51] Int. Cl.⁶ ............................................. B23P 23/00
[52] U.S. Cl. ........................... 29/564; 29/563; 29/33 P; 29/888.09; 198/346.2; 198/580; 269/56
[58] Field of Search ............................. 198/580, 346.1, 198/346.2; 29/563, 564, 564.1, 33 P, 888.09; 901/7; 269/56, 58, 91

[56] References Cited

U.S. PATENT DOCUMENTS

| | | | |
|---|---|---|---|
| 3,530,571 | 9/1970 | Perry | 198/346.1 |
| 3,741,048 | 6/1973 | Peuterbaugh | 29/33 P |
| 3,909,922 | 10/1975 | Takasaki et al. | 29/563 |
| 3,934,700 | 1/1976 | Schubert et al. | 198/580 |
| 3,946,484 | 3/1976 | Aronstein et al. | 29/563 |
| 4,030,179 | 6/1977 | Schwarz . | |
| 4,143,776 | 3/1979 | Meyers et al. | 414/735 |
| 4,300,274 | 11/1981 | Papst . | |
| 4,309,600 | 1/1982 | Perry et al. | 29/33 P |
| 4,414,726 | 11/1983 | Cale, Jr. . | |
| 4,432,130 | 2/1984 | Gabriele . | |
| 4,485,911 | 12/1984 | Cameron . | |
| 4,503,596 | 3/1985 | Ida et al. | 29/33 P |
| 4,531,665 | 7/1985 | Cale, Jr. . | |
| 4,609,002 | 9/1986 | Noh et al. | 269/56 |
| 4,629,384 | 12/1986 | Beshke et al. | 414/222 |
| 4,653,739 | 3/1987 | Moore . | |
| 4,688,446 | 8/1987 | Ishikawa . | |
| 4,767,109 | 8/1988 | Raketich . | |
| 4,794,686 | 1/1989 | Moore | 29/33 P |
| 4,827,795 | 5/1989 | Machida et al. . | |
| 4,955,463 | 9/1990 | Honma et al. . | |
| 5,052,540 | 10/1991 | Matsuyama et al. . | |
| 5,125,141 | 6/1992 | Katoh et al. | 269/56 |
| 5,145,052 | 9/1992 | Santandrea et al. | 198/346.2 |
| 5,177,862 | 1/1993 | Speece | 29/824 |
| 5,178,255 | 1/1993 | Carlson | 29/33 P |
| 5,283,938 | 2/1994 | Jones . | |
| 5,321,874 | 6/1994 | Mills et al. . | |

FOREIGN PATENT DOCUMENTS

| | | |
|---|---|---|
| 0499443A2 | 8/1992 | European Pat. Off. . |
| 1376657 | 2/1965 | France . |
| 2268596 | 11/1975 | France . |

*Primary Examiner*—Daniel W. Howell
*Assistant Examiner*—Christopher Kirkman
*Attorney, Agent, or Firm*—Young & Basile, P.C.

[57] ABSTRACT

An apparatus and method for performing a sequence of machine operations on connecting rod blanks to convert the blanks from an original casting to a finished product includes loading parts at a beginning of a process stream for performing various machining operations on the parts as the parts travel along the process stream. The process stream is defined at least in part by a first path portion extending between opposing work stations for partially machining the parts, and recirculating the partially machined parts along the process stream into a second path portion. The second path portion extends parallel with the first path portion of the process stream in order to provide generally symmetrically opposing machining operations at the opposing work stations along a portion of the process stream. Lift and carry devices engage and move the raw parts and recirculating parts simultaneously between adjacent opposing work stations in step fashion. The raw parts and the recirculating parts are held in predetermined positions at each work stations within nests in cooperation with reciprocal holding devices to maintain the parts within the nests during the machining operations.

41 Claims, 7 Drawing Sheets

PROCESS AND APPARATUS FOR MANUFACTURING CONNECTING RODS

RELATED APPLICATIONS

This application is a continuation of provisional patent application serial No. 60/039,373 filed on Mar. 20, 1997.

FIELD OF THE INVENTION

The present invention relates to a process and apparatus for manufacturing work pieces, such as connecting rods, and in particular to a recirculating process loop through opposing work stations along a portion of a process stream, and more particularly to moving the parts through the recirculated process stream portion in synchronized, step-wise movement with the raw parts.

BACKGROUND OF THE INVENTION

In the past, the equipment and process for manufacturing connecting rods required a large area of the plant floor and took numerous individual machining operations. The prior known process included loading the parts at the beginning of the processing stream. After loading, the raw connecting rods are passed through an audit weight operation before entering a rough grind operation. After the rough grind operation, the connecting rods pass through a rough bore operation. After passing through the rough bore operation, a bolt hole drilling operation is then performed. After the bolt hole drilling operation, the connecting rods pass through a primary washer and then to a crack and assemble operation. After the crack and assemble operation, the connecting rods are passed through a finish grind operation before passing through a finish bore operation. An oil squirt hole drilling operation is then performed prior to a hone and final gauge operation. Following the final gauge and hone operation, a final wash is performed prior to unload. This process requires numerous individual machines for each step of the operation. In particular, the boring operations require several machines in order to perform the rough bore and the bolt hole drilling, as well as the finish boring operations. The numerous individual machines required to perform these operations take up an extensive amount of valuable plant floor space.

SUMMARY OF THE INVENTION

The connecting rod manufacturing process according to the present invention includes loading the parts at the beginning of a process stream for performing various machining operations as described in greater detail below. The process stream defines a recirculating loop passing through a plurality of machines for machining the connecting rods. The stream loops back through a path parallel to a first portion of the workpiece processing stream. In the first portion of the workpiece processing stream, the connecting rods are passed through approximately eight drill and tap machines to drill and tap the bolt receiving aperture into the connecting rod. After passing through the drill and tap bolt aperture operations, the connecting rods are transported by conveyor to a primary washer, and thereafter the connecting rods pass through known equipment to crack and assemble each of the connecting rods. The connecting rods then pass through a finish grind process and are returned in a loop to a point adjacent to the load station where the parts are reoriented as will be described in greater detail below in order to pass through a series of boring machines to first rough the bore for the crank arm and rough the bore for the pin, and then to finish the crank arm and pin bores. After passing through approximately four boring machines, the connecting rods are diverted along a conveyor path to a final washer and unloading area.

The connecting rods are feed into the system from the loading station into a step conveyor at spaced intervals for subsequent feeding to the equipment for drilling and tapping the bolt apertures. The flow of connecting rod parts from the return loop is also feed into the loader along an opposite side. The recirculating partially-machined connecting rod parts are reoriented from a generally horizontal position to a generally vertical position. These reoriented parts are carried in synchronized step movement with the parts being positioned on the equipment to drill and tap the bolt apertures, while the vertically extending parts are subjected to a machining operations to rough and finish the apertures for the crank arm and the pin as will be described in greater detailed below.

At a typical machining work station, the horizontally disposed connecting rod workpiece is carried to a first holding fixture and is held in place by a first reciprocatable and rotatable cylinder which operates as will be described hereinafter. While held in this position at various stations by corresponding first cylindrical members, the bolt apertures are drilled and tapped. The horizontally disposed connecting rod parts are carried to the first holding or clamping fixture by arms of the synchronized step movement conveyor. The vertically disposed connecting rod parts are simultaneously carried into position by releasable transport clamps and are held in position by a second reciprocatable piston and clamp fixture. While held in this position at various stations by corresponding second piston and clamp fixtures, the crank arm aperture is roughed and finished, and the pin aperture is roughed and finished, in the corresponding machining work stations along the process stream.

Multiple machining work stations are disposed side by side for drilling and tapping bolt apertures, and for roughing and finishing crank arm and pin apertures. The first reciprocatable and rotatable piston and clamp fixtures hold the horizontally disposed connecting rod parts for drilling and tapping of the bolt apertures, while the second reciprocatable piston and clamp fixtures hold the vertically disposed connecting rod parts passing through this portion of the return loop for roughing and finishing the crank arm aperture and the pin aperture. The connecting rod parts are moved in synchronized step fashion, so that four parts are carried from the first work station to a second work station, simultaneously four parts are carried from the second station to a third work station, and so on. In order to provide sufficient clearance for the crank arm and pin roughing tools, the first work station roughs the crank arm aperture and pin aperture in the left-hand-side, vertical-oriented connecting rod part, while the right-hand-side, vertical-oriented connecting rod part has the crank arm aperture and pin aperture roughed at the second work station. Both the right and left hand connecting rod parts have the crank arm aperture finished at the third work station, while the pin bore for both the right hand and left hand connecting rod parts are finished at a fourth work station. The first reciprocating and rotatable piston and clamping fixtures are movable between first and second positions corresponding to a clamped position and a released position. The clamped position is a vertically lower position where the fixture is engaging the connecting rod parts, while the released position is elevated with respect to the clamped position and the clamping fixture is vertically spaced above the connecting rod parts.

The operation of the first reciprocating and rotatable piston and clamping fixture can best be understood by reference to a generally helical or arcuate slot formed in the external periphery of the outwardly extending rod of the piston assembly. Rollers or guide members are supported with respect to a portion of the housing for sheathing a portion of the rod, so that the cam or roller moves within the arcuate slot or cam surface causing the first reciprocating piston and attached clamping fixture to rotate through approximately 90° between the lower clamping position and the raised, released position.

A lift and carry transport apparatus is provided for movement of the connecting rod parts between the various work stations. As previously described, the horizontally disposed and vertically disposed connecting rod parts are held in place by the first reciprocating piston and clamping fixtures during the machining operations. The parts are engaged for transport between the work stations by the transport clamps which can be operatively actuated between engaged and disengaged positions by a mechanism including a cylinder, crank arms, links and levers. When the cylinder is retracted, the crank arms and connected links operate to move the transfer clamps inwardly to engage the connecting rod parts therebetween. When the cylinder is extended, the crank arms and connecting links are operated to cause the transport clamps to rotate outwardly in disengaging movement with respect to the connecting rod parts when in the appropriate positions for clamping by the first and second piston and clamp fixtures as previously described. The entire overhead transport carrier is supported on rollers connected to upwardly extending rotatable arms connected for rotation with a sleeve or cylinder having a horizontally extending rotational axis.

The driving means for rotating the vertically extending arm includes a rotatable crank arm moveable through at least 180°. The crank arm is connected by an elongated link to a shorter vertically extending arm connected to the rotatable cylinder or sleeve for driving the sleeve and connected short arm and long arm in rotation about the axis of the sleeve. A connecting link transmits the motion to the next work station for driving the overhead transport carriers in synchronized movement with the respect to one another. The vertically extending long arm is rotated about the horizontally extending rotational axis of the sleeve, while the roller engages within a slot defined by the guide member. The guide member or housing is moved generally vertically along the guide cylinder or rods. A motor is connected to the guide housing for driving a gear with respect to a rack in order to move the overhead transport carrier between the work station in forward and reverse movement along the path of travel for the connecting rod parts.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
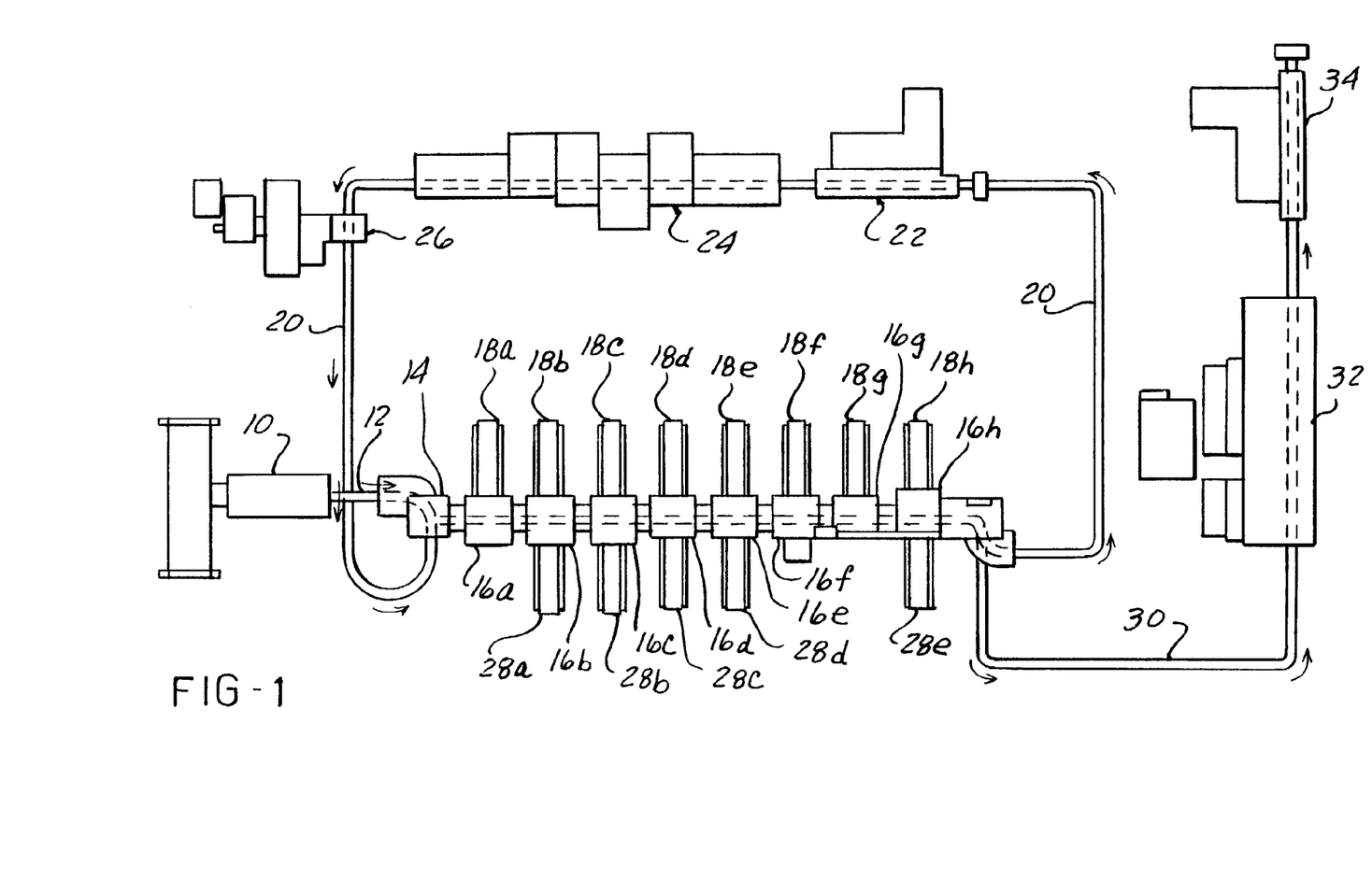
FIG. 1 is a plan view schematically illustrating a process and apparatus for performing a sequence of operations on raw parts or blanks to convert the blanks from an original casting to a finished product according to the present invention.

An apparatus and method for manufacturing connecting rods is schematically illustrated in plan view in FIG. 1. According to the present invention, parts or blanks are loaded at the beginning of the process stream for performing various machining operations thereon. The parts, such as connecting rods, are feed into the system from the loading station 10 into a step conveyor 12 at spaced intervals for subsequent feed to a reorientation station 14 where the raw parts are positioned for engagement by a lift and carry transport apparatus to be described in greater detail below. The lift and carry transport apparatus moves the workpieces between a series of work stations identified as 16a–16h in the schematic diagram of FIG. 1 along the first portion of the workpiece processing stream or path. The workpieces pass through approximately eight drill and tap machines 18a–18 to drill and tap the bolt-receiving aperture into the connecting rod workpiece. After passing through the drill bolt aperture operation, the workpieces are transported by conveyor 20 in a recirculating loop through a primary washer 22 and a crack and assemble apparatus 24. The crack and assemble apparatus 24 is of the type generally known to those skilled in the art, such as that disclosed in U.S. Pat. No. 5,283,938 or any similar apparatus performing the same function. The conveyor 20 then passes the recirculating workpieces through a finish grind apparatus 26 for finishing opposite longitudinally extending surfaces of the workpieces. The conveyor 20 then returns the recirculating parts to the reorientation station 14. The recirculating parts then pass through a second portion of the workpiece processing stream extending parallel to the first portion of the workpiece processing stream. The recirculated workpieces are reoriented at the reorientation station 14 from a generally horizontal orientation to a generally vertical orientation. The lift and carry apparatus simultaneously engages the workpiece blanks and the recirculated workpieces at the reorientation station for simultaneous movement to the first work station 16a, and subsequent simultaneous stepwise movement between the remaining work stations in the series. After the machining operation has been performed at each of the work stations, the recirculated or particularly finished workpieces are carried through multiple machining work stations 16a–16h, where rough boring and finish boring operations are selectively performed on the reorientated, recirculating parts by rough and finish boring machines 28a–28d. A final gauge operation can be performed at work station 16h by audit machine 28e. In operation, four workpieces are moved in step fashion from the reorientation station 14 to the first work station 16a. At the first work station 16a, the first drill and tap machine 18a begins machining operations on the two generally horizontally disposed workpiece blanks. The four workpieces are then transferred in step-wise fashion by the lift and carry transport apparatus to the second work station 16b, where a second drill and tap machine 18b continues the drilling and tapping operations on the two generally horizontally disposed work pieces, while simultaneously, a rough boring operation is being performed by rough boring machine 28a at work station 16b. The first boring machine 28a roughs the crank arm aperture and pin aperture in the left hand side of the generally vertically oriented recirculated workpiece held at the work station 16b. After completion of the machining operations at the second work stations 16b, the lift and carry transport apparatus moves the four workpieces to the third work station 16c. At the third work station 16c, a third drill and tap machine 18c continues machining operations on the two generally horizontally disposed workpieces, while simultaneously a second boring machine 28b roughs the crank arm aperture and pin aperture in the right hand side of the generally vertically oriented recirculating workpieces. The four workpieces are then carried by the lift and carry transport apparatus to the fourth work station 16d. A fourth drill and tap machine 18d continues the machining operations on the two generally horizontally disposed workpieces, while simultaneously a finish boring operation is preformed on the crank arm apertures of both the right hand and the left hand generally vertically oriented workpieces. After the lift and carry transport apparatus has moved the four workpieces to the fifth work station 16e, a fifth drill and tap machine 18e continues to preform machining operations on the two generally horizontally disposed workpieces, while simultaneously the pin bores for the both right hand and the left hand generally vertically orientated parts receive the finish boring operation with the boring machine 28d. After moving through the gauge and audit machine 28e, the finished parts are carried by step conveyor 30 to a final washer 32 before being unloaded at the unloading station 34.

Figure 2:
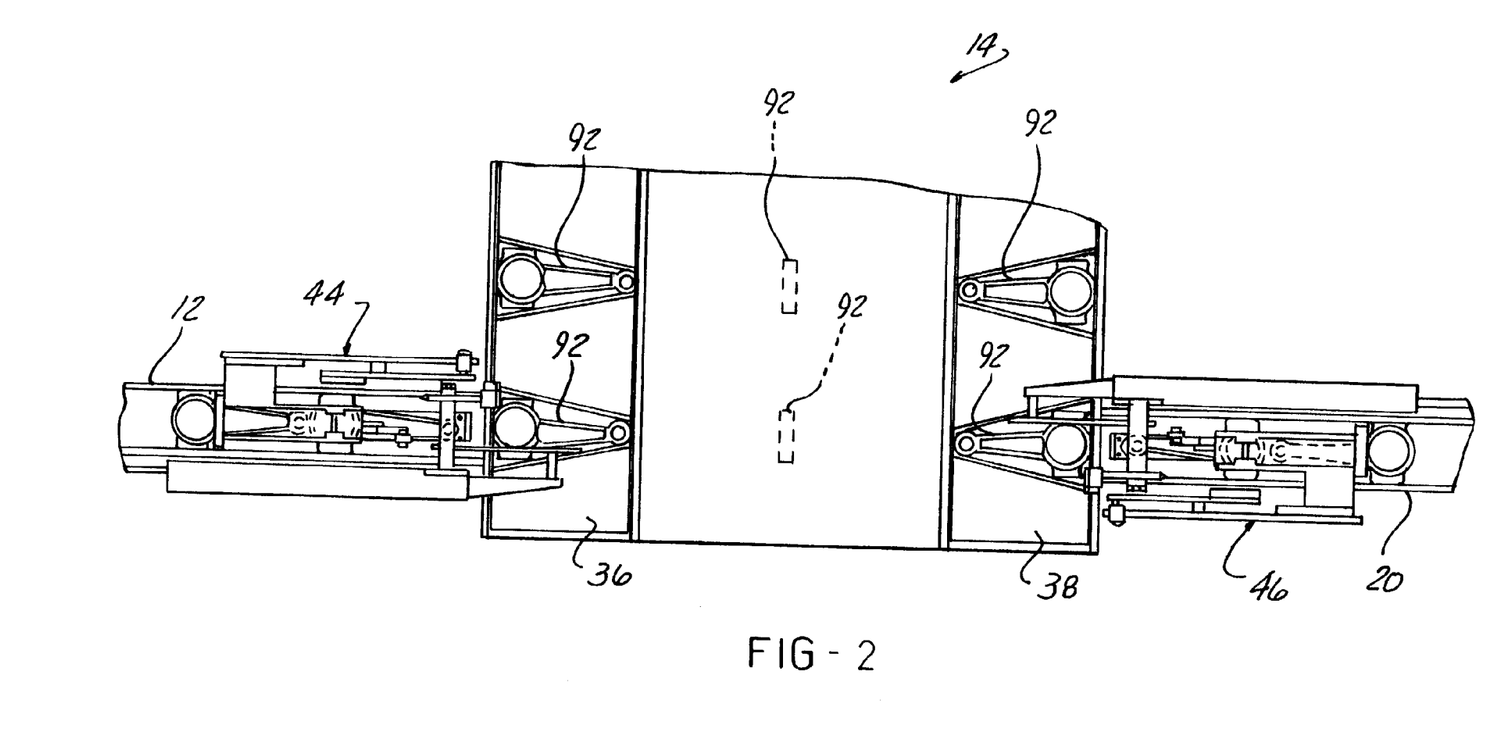
FIG. 2 is detailed plan view of the loading station and recirculating station according to the present invention.
Figure 3:
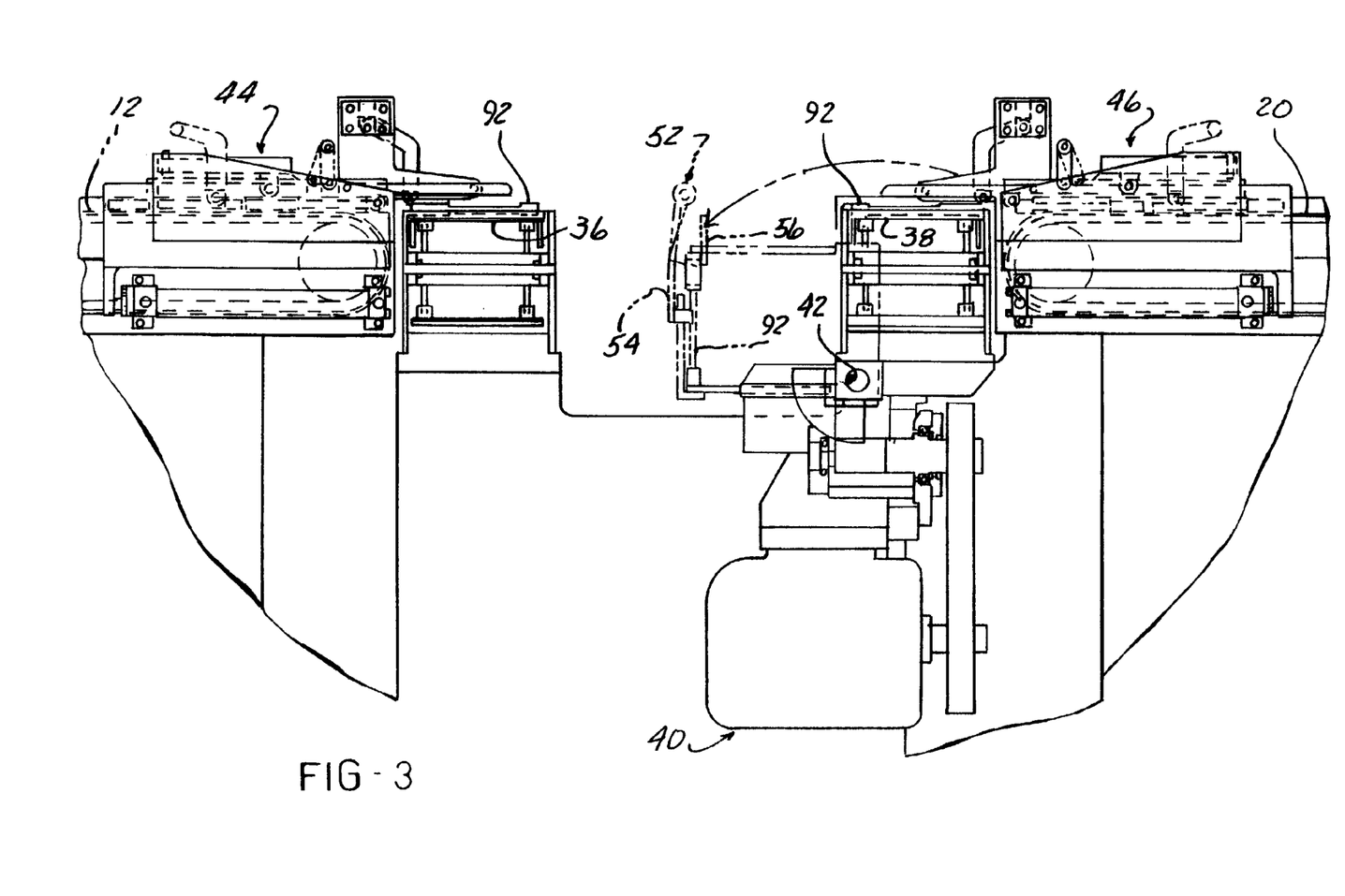
FIG. 3 is side elevational view of the loading and recirculating station illustrating reorientation of the recirculating parts from a generally horizontal position to a generally vertical position.

Referring now to FIG. 2, the step conveyor 12 loads raw parts or blanks on to a first part conveyor 36 at reorientation station 14. The recirculation conveyor 20 loads partially completed parts onto a second part conveyor 38. The first and second part conveyors 36 and 38 are generally disposed on opposite sides of the reorientation work station 14 and extend along a parallel path of travel for the parts to be received thereon. When a predetermined number of raw parts and partially machined recirculating parts have been loaded onto the first and second part conveyors 36 and 38, the recirculating parts are reorientated from a generally horizontal position as illustrated in FIG. 2 to a generally vertically extending position shown in phantom in FIG. 2 and as illustrated in the elevational view in phantom of FIG. 3. Drive means 40 is provided for pivoting the recycled parts carried on the second part conveyor 38 about the pivot pin 42. The raw parts and the recycled parts are individually loaded onto the corresponding first and second part conveyors 36 and 38 by respective first and second means for loading 44, 46. Once loaded in predefined longitudinally spaced positions along the first and second part conveyors 36, 38, and after the recycled parts are reorientated from the generally horizontal position or first position to the generally vertical position or second position, the raw parts and the recycled parts are engaged by a lift and carry means 48 best seen in FIG. 6 for transporting the raw parts and the recycled parts simultaneously between work stations, beginning with the reorientation station 14.

Figure 6:
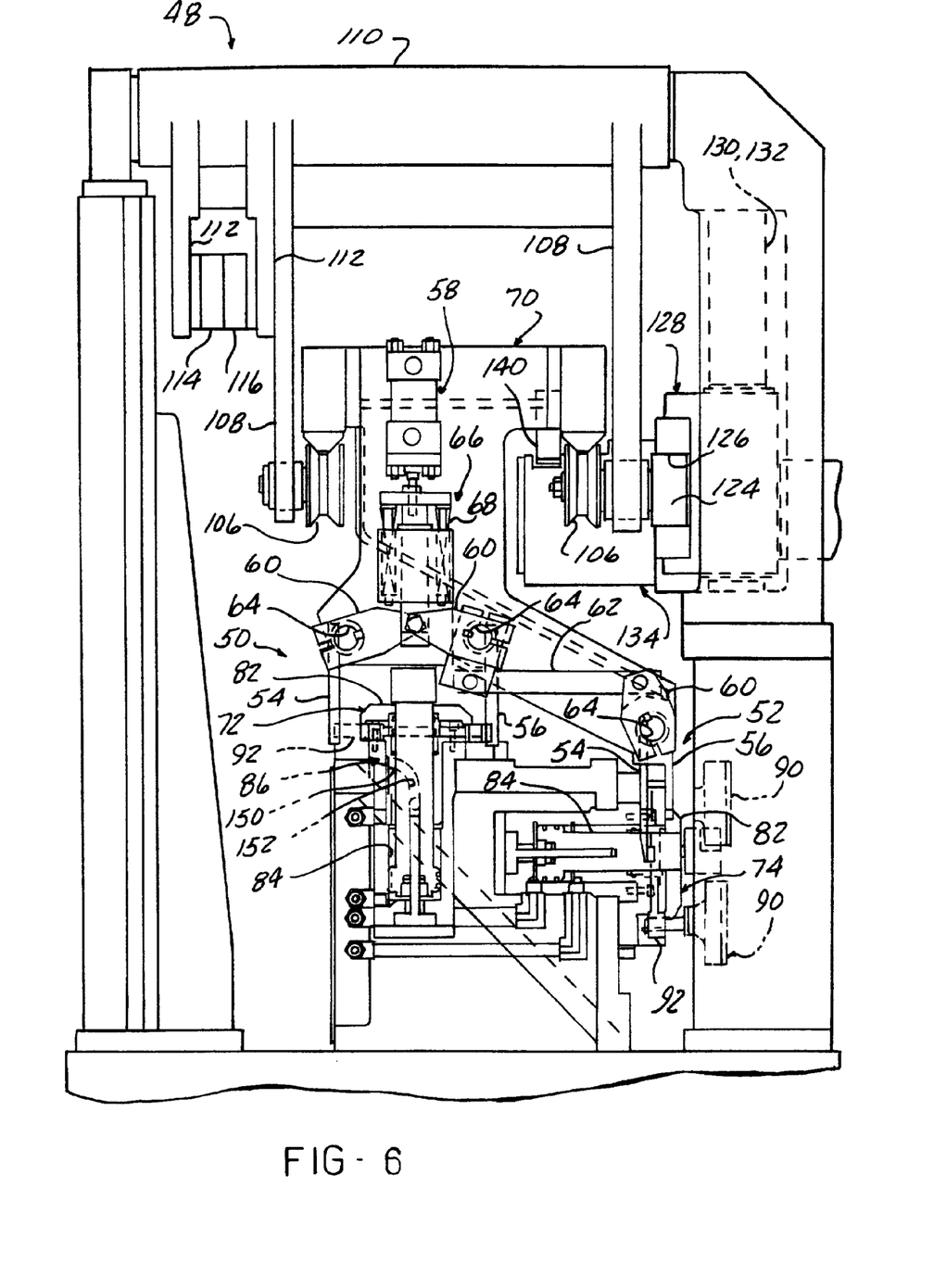
FIG. 6 is a side elevational view transverse to the process stream flow illustrating a typical work station and a lift and carry transport apparatus for moving the parts between the various work stations.

Referring briefly to FIG. 6, the lift and carry means 48 includes first and second grippers 50, 52 for operable engaging and disengaging the raw parts and the recycled parts as the parts proceed through work stations 16a through 16h. Each of the first and second grippers 50, 52 includes first and second opposing members or tongs 54, 56 for engaging opposite edges of the parts to be lifted and carried from one work station to another. At least one of the first and second opposing members 54, 56 of the first and second grippers 50, 52 is movable with respect to the other member in response to actuator means 58. The actuator means 58 moves one or more of the opposing members 54, 56 with respect to one another in order to engage and disengage the respective parts to be lifted and carried between work stations. The actuator means 58 can take the form of a cylinder with a reciprocal piston disposed therein for driving a plurality of lever arms 60 directly, or through linkages 62, for movement about respective pivot pins 64. Safety means 66, such as one or more compression springs 68, can be provided for maintaining the opposing members 54, 56 in the engaged position in the event of failure of the actuator means 58. The first and second grippers 50, 52 are supported on carriage means 70 for reciprocating movement between first and second end limits of travel along the parallel paths of the raw parts and the recirculating parts. The movement and operation of the carriage means 70 will be described in greater detail below.

Figure 4:
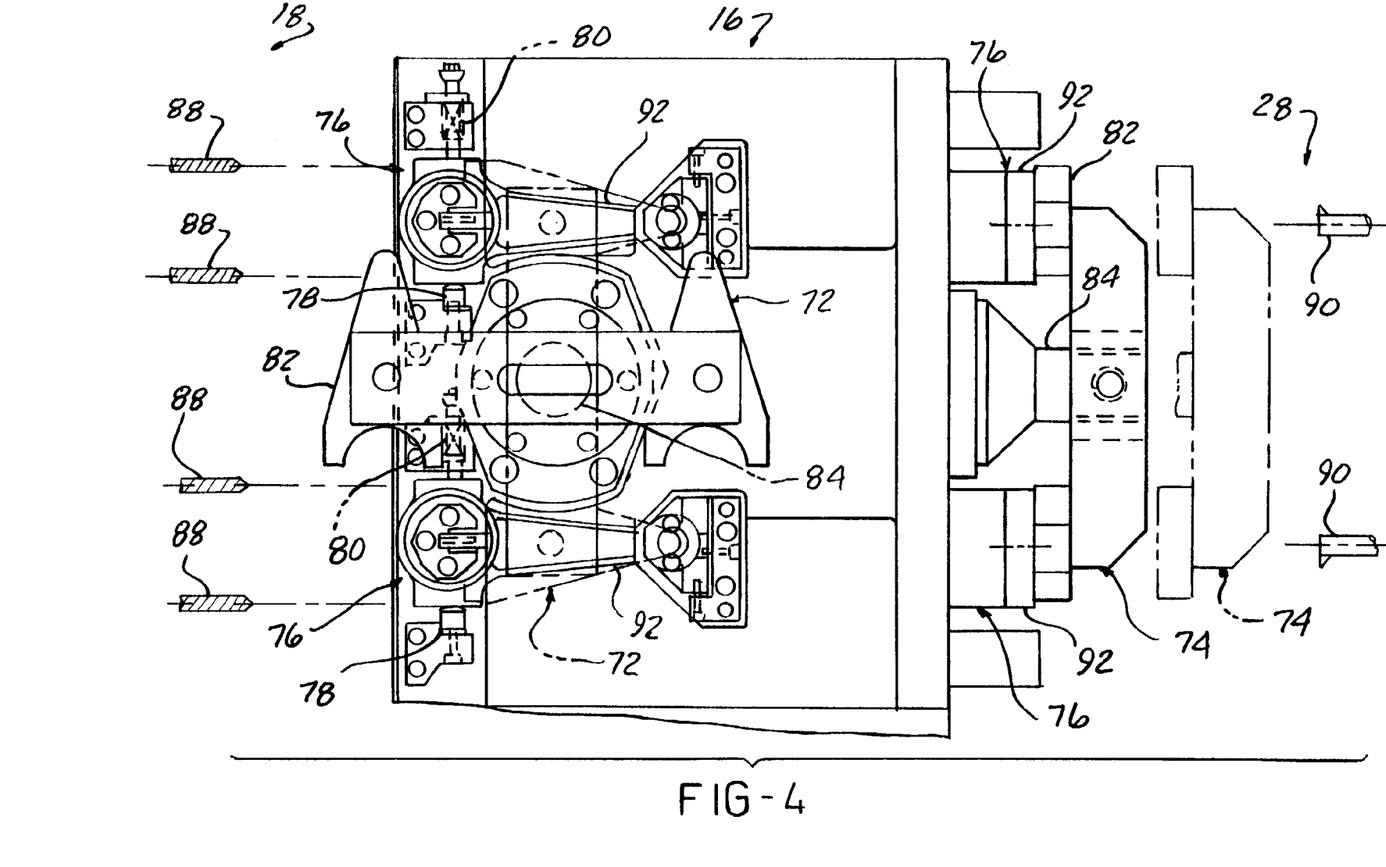
FIG. 4 is a plan view of a typical work station along a first portion of the process stream for drilling or tapping the raw part stream while the recirculated, particularly machined part stream is subjected to roughing or finishing boring operations.
Figure 5:
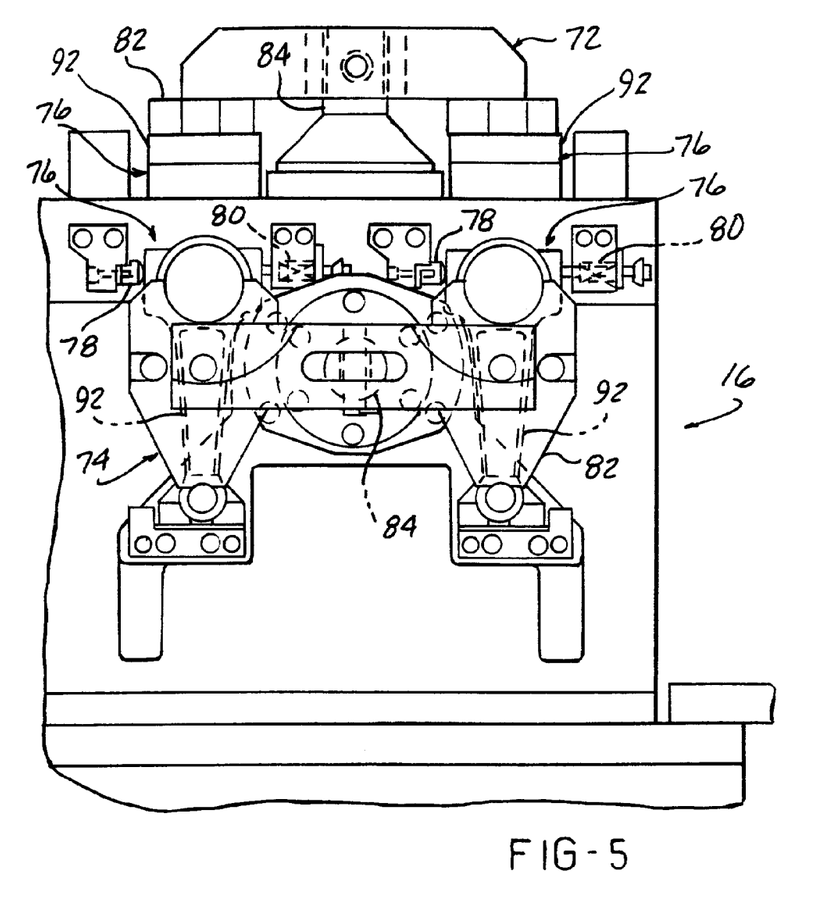
FIG. 5 is a side elevational view of the typical work station illustrated in FIG. 4.

Referring now to FIGS. 4–6, a typical work station 16 is illustrated. Each work station 16 includes first means 72 for holding the raw parts in position with respect to the work station 16, and second means 74 for holding the recirculating parts in fixed position with respect to the work station 16. Each of the first and second holding means 72, 74 can include a nest 76 for receiving the part to be worked. Each nest 76 preferably includes an adjustable stop 78 for locating the part with respect to the work station 16, and biasing means 80 for driving the part disposed within the nest 76 toward the adjustable stop 78. Each of the first and second holding means 72, 74 also includes a clamping member 82 for retaining the part within the nest 76 when in a first position, and movable from the first position to a second position for permitting removal of the part from the nest 76. Each clamping member 82 can be connected to a reciprocal drive 84, such as a piston for actuating the clamping member 82 between the first and second positions. In addition, to provide adequate clearance for removal of the part from the nest with respect to the first holding means 72, the reciprocal drive 84 can include means 86 for rotating the clamping member 82 as the clamping member 82 moves between the first and second position. Preferably, the rotating means 86 as best seen in FIG. 6 can include a roller or cam 150 disposed within the cylinder and cooperatively engaging a cam surface 152 connected to the reciprocal drive 84 for moving the reciprocal drive 84 in rotation in response to movement of reciprocal drive 84 thereby causing the clamping member 82 to rotate preferably through at least 90 degrees of rotation between the first position and the second position. The first position of the clamping member 82 for the first holding means 72 is illustrated in phantom in FIG. 4, and the second position of the clamping member 82 for the first holding means 72 is shown in solid line in FIG. 4. The first position for the clamping member 82 for the second holding means 74 is shown in solid line in FIG. 4, and the second position for the clamping member 82 for the second holding means 74 is shown in phantom in FIG. 4. The machining operations are performed when both clamping members 82 are in the first position to hold the parts with respect to the nest 76. During the machining operations, one or more drills or threading devices 88 can operable engage the parts held within the nests 76 by the first holding means 72 to rough the apertures, finish the apertures and thread the apertures for the bolts to hold the part together after cracking. Simultaneously, one or more boring devices 90 can operable engage the recirculating parts to rough at least one of the bores, or finish at least one of the bores for the pin and crank arm of the part. Preferably as previously described, the drilling and threading of the bolt apertures takes place as the raw parts pass through work stations 16*a*–16*h* by drill and tap machines 18*a*–18*h* respectively. Simultaneously at work stations 16*b*–16*e*, the boring machines 28*a*–28*d* rough and finish the crank arm bore and the pin bore.

Figure 10:
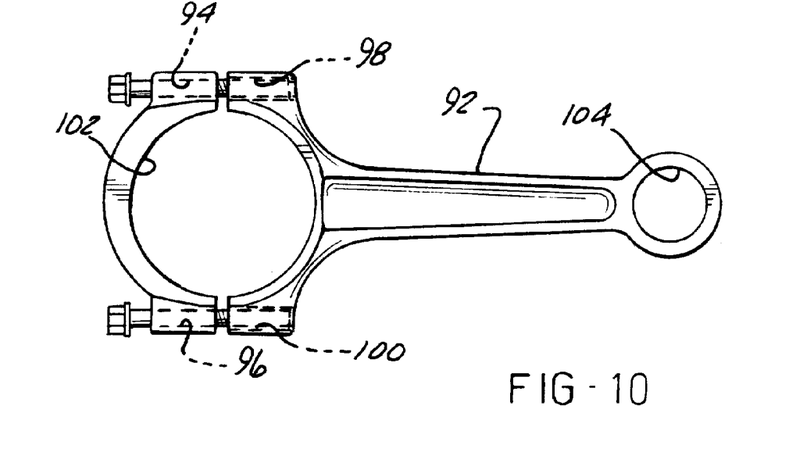
FIG. 10 is a typical connecting rod part manufactured according to the present invention.

Referring now to FIG. 10, a finished part 92 is illustrated. The part 92 preferably includes first and second bolt apertures 94, 96, each aperture having a threaded portion 98, 100 respectively. The part 92 also includes a crank arm bore or aperture 102 and a pin bore or aperture 104. It should be recognized that other structural configurations of parts can be processed through the apparatus according to the present invention, and using the method according to the present invention as disclosed herein. The part depicted in FIG. 10 is for illustration purposes, and by way of example, not for purposes of limiting the scope of the present invention.

Figure 7:
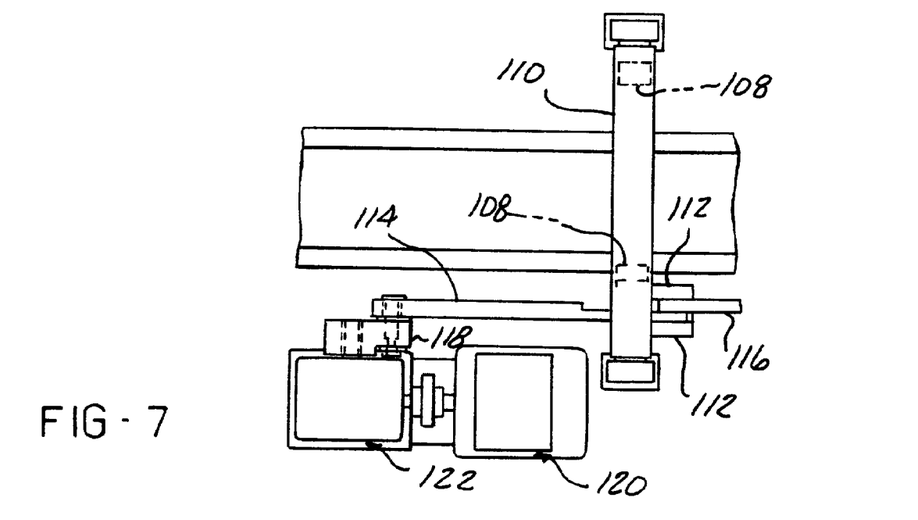
FIG. 7 is a plan view of the drive means for the lift and carry transport apparatus illustrated in FIG. 6.
Figure 8:
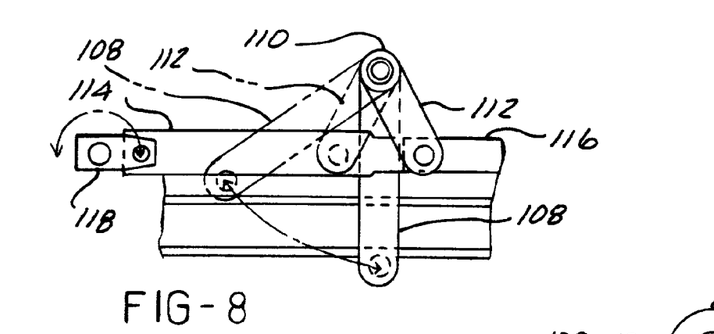
FIG. 8 is a side elevational view of the drive linkage for the lift and carry transport apparatus illustrated in FIG. 7.

Referring now to FIG. 6 through FIG. 9, the operation and movement of the lift and carry means 48 will be described in greater detail to illustrate the movement of the raw parts and the recycled parts along the parallel path through work stations 16*a*–16*h*. As best seen in the upper half of FIG. 6, the carriage means 70 is supported on a plurality of rollers 106 for reciprocating movement along the common path of travel of the raw parts and the recirculating parts. The rollers 106 are connected to elongated, generally downwardly extending arms 108. The arms 108 are fixedly connected to a cylindrical member 110 and are spaced longitudinally from one another with the carriage means 70 interposed therebetween. The arms 108 extend radially outwardly from the cylindrical member 110. The rollers 106 are connected to the arms 108 adjacent a radially outwardly extending end of each arm 108. The cylindrical member 110 is rotatable about a longitudinally extending axis disposed transverse to the path of travel of the raw parts and recirculating parts. A pair of short arms 112 extend radially outwardly from the cylindrical member 110 and are disposed spaced longitudinally from one another. A first link 114 and a second link 116 are connected to the pair of short arms 112 for driving the cylindrical member 110 in rotation about its longitudinal axis. As best seen in FIGS. 7 and 8, one of the links, such as first link 114, is connected to a crank arm 118 for driving the short arms 112 in rotational movement about the longitudinal axis of the cylindrical member 110 causing the carriage means 70 at each work station to be raised and lowered on elongated arms 108 in response to rotation with respect to the longitudinal axis of the cylindrical member 110. Simultaneously, the driving motion is carried to similar structure at each work station through second link 116. Crank arm 118 is driven in rotation by appropriate motor means 120 and gear means 122. The motor means 120 and gear means 122 rotatable drive the crank arm 118 through at least 180 degrees of rotation, and is reversible through the same 180 degrees of rotation, or continues in rotation through the remaining 180 degrees in the same direction to return to the starting point.

Figure 9:
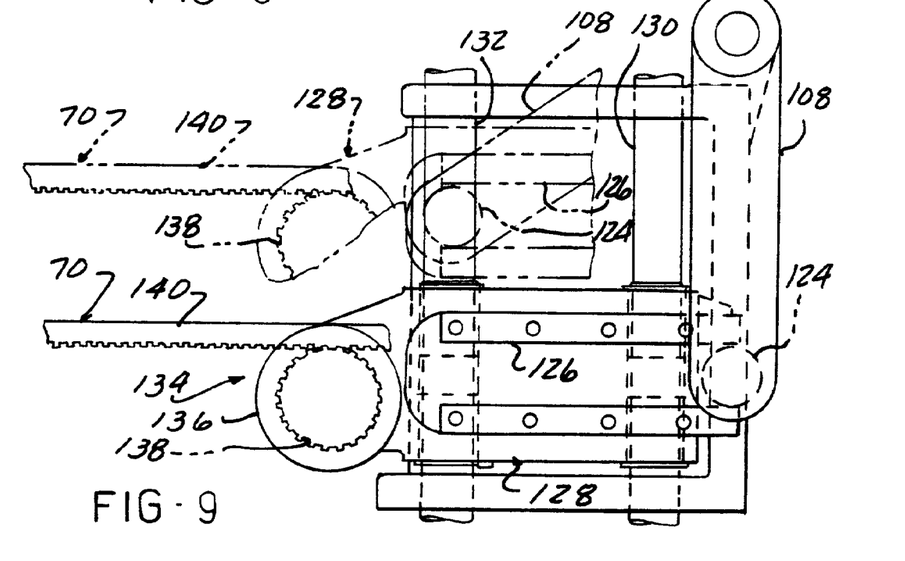
FIG. 9 is a detailed view of the lift and carry transport apparatus taken as shown in FIG. 6.

Referring now to FIGS. 6 and 9, a cam roller 124 is connected to one of the elongated downwardly extending arms 108 for movement with the arm 108 about the longitudinal axis of the cylindrical member 110. The cam roller 124 is operably engaged within a slot 126 defined by vertical shuttle means 128. Vertical shuttle means 128 moves between first and second end limits of travel along first and second guide members 130, 132. As the elongated arm 108 rotates with the cylindrical member 110, the captured cam roller 124 is engaged within slot 126 to drive the vertical shuttle means 128 between the first and second end limits of travel. Carriage drive means 134 is supported on the vertical shuttle means 128 for operably engaging and driving the carriage means 70 along the path of travel of the raw parts and the recycled parts between adjacent work stations. The lift and carry means 48 illustrated in FIG. 6 is typical of each work station. Each work station includes a corresponding cylindrical member 110, downwardly extending elongated arms 108, a pair of short arms 112, carriage means 70, vertical shuttle means 128 and carriage drive means 134 in order to sequentially move the raw parts and recirculating parts from one work station to the next work station between the various machining operations. The carriage drive means 134 can include motor means 136 for rotatably driving a pinion gear 138 in reversible motion about an axis. The pinion gear 138 is operably engagable with a rack 140 connected to the carriage means 70.

In operation, with a first carriage means 70 in a lowered position adjacent the raw parts and reorientated recirculating parts at the reorientation station 14, actuator means 58 drives the first and second grippers 50, 52 into engagement with the raw parts and recirculating parts. After engagement with the parts, motor means 120 is actuated to drive cylindrical member 110 through linkage 114 in rotation to lift the carriage means 70 from the lower position to an upper position. In response to movement of the elongated arms 108, the vertical shuttle means 128 is lifted along first and second guide members 130, 132 to maintain engagement of the carriage drive means 134 with the carriage means 70. The motor means 136 carried by the vertical shuttle means 128 is operated to drive the carriage means 70 in movement between the reorientation station 14 and the first work station 16*a*. At the first work station 16*a*, motor means 120 is activated to lower the carriage means 70 from the upper position to the lower position. When in the lower position, actuator means 58 operates to disengage the first and second grippers 50, 52 to place the raw parts and recirculating parts in the corresponding nests 76. Motor means 120 is then operated to raise the carriage means 70 from the lower position to the upper position. Carriage drive means 134 then operates to return the carriage means 70 to the reorientation station 14. After return to the reorientation station 14, the first carriage means 70 is moved from the upper position to the lower position by operation of the motor means 120. Simultaneously, a second carriage means is returned to the first work station 16*a* from the second work station 16*b* by operation of second carriage drive means 134 engaging the second carriage means 70. Operation of the motor means 120 drives the second carriage means from the upper position to the lower position through link 116 engaged with the pair of short arms 112 fixedly connected to the cylindrical member 110, and through the elongated arms 108 supporting the second carriage means 70. During the return trip of the various plurality of carriage means 70, the first and second means for holding 72, 74 are operated to engage the parts and hold the parts within the corresponding nest 76 during the machining operations at the various work stations. The cycle then repeats to move the work pieces from the work station 16*a* to the second work station 16*b* for further machining operations by repetition of the operation described above and so forth through each sequential work station 16*a*–16*h*.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for manufacturing connecting rods from blank parts comprising:

means for performing machining operations on a plurality of parts as the parts travel along a predetermined path, the predetermined path defined at least in part by a first path portion extending between a plurality of opposing work stations for partially machining the parts and a second path portion extending generally parallel to said first path portion between the same plurality of opposing work stations for machining partially-machined parts; and means for recirculating the partially-machined parts from an end of the first path portion to a beginning of the second path portion of the predetermined path.

2. The apparatus of claim 1 further comprising:

means for moving the parts along the first path portion and the second path portion in synchronized, step-wise movement with the parts carried in a generally horizontal position along the first path portion and recirculated parts carried in a generally vertical position along the second path portion, said moving means simultaneously moving the generally horizontal and vertical parts between the opposing work stations along the predetermined path.

3. The apparatus of claim 2 wherein said moving means further comprises:

each work station having carriage means for carrying said parts between adjacent work stations; and gripper means, carried by said carriage means, for selectively engaging said parts at an upstream work station location and for selectively disengaging said parts at a downstream work station location.

4. The apparatus of claim 3 further comprising:

said carriage means moveable between a first position disposed vertically adjacent said work stations, a second position disposed spaced vertically above said work stations, a third position disposed at a first horizontal end limit of movement and a fourth position disposed at a second horizontal end limit of movement.

5. The apparatus of claim 4 wherein said moving means further comprises:

each work station having lift means for elevating parts with respect to said work stations during transport between work stations.

6. The apparatus of claim 5 further comprising:

each work station having drive means for reciprocating said carriage means selectively in upstream and downstream directions with respect to said predetermined path of said parts.

7. The apparatus of claim 3 wherein said gripper means further comprises:

first and second pairs of gripping members, at least one of each pair of gripping members moveable with respect to the other gripping member for releasibly interposing said part therebetween during transport between work stations.

8. The apparatus of claim 7 further comprising:

actuator means for driving said at least one of each gripping members selectively toward and away from said other of each pair of gripping members for engaging said part therebetween.

9. The apparatus of claim 1 further comprising:

first means for holding at least one part in a generally horizontal first position at each work station along said first path portion; and second means for holding at least one recirculated part in a generally vertical second position at each work station along said second path portion.

10. The apparatus of claim 9 further comprising:

each of said first and second holding means including at least one nest at each work station for receiving a part and at least one corresponding clamping member moveable between a first position engaging a nested part to hold the part stationary with respect to said work station and a second position allowing removal of the part from said nest; and means for reciprocating said clamping member at each work station between said first and second positions.

11. The apparatus of claim 10 wherein said first holding means further comprises:

means for rotating said clamp member about an axis of rotation as said reciprocating means moves said clamping member between said first and second positions.

12. The apparatus of claim 1 further comprising:

means for drilling bolt-receiving bores in the parts passing through the first path portion; and means for tapping the bolt-receiving bores in the parts passing through the first path portion after drilling.

13. The apparatus of claim 1 further comprising:

means for boring crank arm bores in the parts passing through the second path portion; and means for boring pin bores in the parts passing through the second path portion.

14. The apparatus of claim 1 wherein the parts traveling along the first and second path portions move simultaneously in the same direction.

15. An apparatus for manufacturing connecting rods from blank parts comprising:

means for performing machining operations on a plurality of parts as the parts travel along a predetermined path, the predetermined path defined at least in part by a first path portion extending between a plurality of opposing work stations for partially machining the parts and a second path portion extending generally parallel to said first path portion for machining partially-machined parts;

means for recirculating the partially-machined parts from the first path portion to the second path portion of the predetermined path; and means for moving the parts along the first path portion and the second path portion in synchronized, step-wise movement with the parts carried in a generally horizontal position along the first path portion and recirculated parts carried in a generally vertical position along the second path portion, said moving means simultaneously moving the generally horizontal and vertical parts between the opposing work stations along the predetermined path, wherein said moving means further includes each work station having carriage means for carrying said parts between adjacent work stations, and gripper means, carried by said carriage means, for selectively engaging said parts at an upstream work station location and for selectively disengaging said parts at a downstream work station location, said carriage means moveable between a first position disposed vertically adjacent said work stations, a second position disposed spaced vertically above said work stations, a third position disposed at a first horizontal end limit of movement and a fourth position disposed at a second horizontal end limit of movement, wherein said moving means further includes each work station having lift means for elevating parts with respect to said work stations during transport between work stations, wherein said lift means further includes each work station having an overhead frame spanning transversely across said predetermined path of travel, a cylindrical member rotatably supported by said overhead frame having an axis of rotation transverse to said predetermined path, radially outwardly extending arms connected to said cylindrical member for supporting said carriage means for movement between work stations, such that rotation of said cylindrical member moves said carriage means vertically with respect to said work stations, and drive means for rotating said cylindrical member about said rotational axis to selectively raise and lower said carriage means with respect to said work stations.

16. An apparatus for manufacturing connecting rods from blank parts comprising:

means for performing machining operations on a plurality of parts as the parts travel along a predetermined path, the predetermined path defined at least in part by a first path portion extending between a plurality of opposing work stations for partially machining the parts and a second path portion extending generally parallel to said first path portion for machining partially-machined parts;

means for recirculating the partially-machined parts from the first path portion to the second path portion of the predetermined path, wherein said moving means further includes each work station having carriage means for carrying said parts between adjacent work stations, and gripper means, carried by said carriage means, for selectively engaging said parts at an upstream work station location and for selectively disengaging said parts at a downstream work station location, said carriage means moveable between a first position disposed vertically adjacent said work stations, a second position disposed spaced vertically above said work stations, a third position disposed at a first horizontal end limit of movement and a fourth position disposed at a second horizontal end limit of movement;

means for moving the parts along the first path portion and the second path portion in synchronized, step-wise movement with the parts carried in a generally horizontal position along the first path portion and recirculated parts carried in a generally vertical position along the second path portion, said moving means simultaneously moving the generally horizontal and vertical parts between the opposing work stations along the predetermined path, wherein said moving means further includes each work station having lift means for elevating parts with respect to said work stations during transport between work stations, each work station having drive means for reciprocating said carriage means selectively in upstream and downstream directions with respect to said predetermined path of said parts; and shuttle means for supporting said drive means operably engaging with said carriage means, said shuttle means supported for synchronized movement with said carriage means.

17. The apparatus of claim 16 further comprising:

said drive means including a pinion gear reversibly driven by a motor and a rack connected to the carriage means.

18. The apparatus of claim 16 wherein said shuttle means further comprises:

guide means for vertically guiding movement of said shuttle means;

rotary drive means for moving said shuttle means vertically; and translation means, connecting said rotary drive means to said shuttle means, for translating rotary motion of said rotary drive means into vertical movement of said shuttle means.

19. The apparatus of claim 18 wherein said translation means comprises the combination of a cam surface and a cam follower connected between the rotary drive means and the shuttle means.

20. An apparatus for manufacturing connecting rods from blank parts comprising:

means for performing machining operations on a plurality of parts as the parts travel along a predetermined path, the predetermined path defined at least in part by a first path portion extending between a plurality of opposing work stations for partially machining the parts and a second path portion extending generally parallel to said first path portion for machining partially-machined parts;

means for recirculating the partially-machined parts from the first path portion to the second path portion of the predetermined path;

first means for holding at least one part in a generally horizontal first position at each work station along said first path portion;

second means for holding at least one recirculated part in a generally vertical second position at each work station along said second path portion;

each of said first and second holding means including at least one nest at each work station for receiving a part and at least one corresponding clamping member moveable between a first position engaging a nested part to hold the part stationary with respect to said work station and a second position allowing removal of the part from said nest;

means for reciprocating said clamping member at each work station between said first and second positions, said reciprocating means including a reciprocal piston disposed within a cylinder for movement between first and second end limits of travel, said piston connected to said clamping member; and means for rotating said clamp member about an axis of rotation as said reciprocating means moves said clamping member between said first and second positions, said rotating means including in combination a cam surface connected to said piston and a cam follower engaging said cam surface for driving said piston and connected clamping member in rotation as said piston moves between said first and second end limits of travel.

21. An apparatus for performing a sequence of machining operations on connecting rod blanks to convert the blanks from an original casting to a finished product comprising:

means for performing machining operations on a plurality of parts as the parts travel along a predetermined path, the predetermined path defined at least in part by a first path portion extending between a plurality of opposing work stations for partially machining the parts and a second path portion extending generally parallel to said first path portion between the same plurality of opposing work stations for machining partially-machined parts;

means for recirculating the partially-machined parts from an end of the first path portion to a beginning of the second path portion of the predetermined path;

means for moving the parts along the first path portion and the second path portion in synchronized, step-wise movement with the parts carried in a generally horizontal position along the first path portion and recirculated parts carried in a generally vertical position along the second path portion, said moving means simultaneously moving the generally horizontal and vertical parts between the opposing work stations along the predetermined path;

first means for holding at least one part in a generally horizontal first position at each work station along said first path portion;

second means for holding at least one recirculated part in a generally vertical second position at each work station along said second path portion;

means for drilling and for tapping bolt-receiving bores in the parts passing through the first path portion; and means for boring crank arm bores and pin bores in the parts passing through the second path portion.

22. A method for performing a sequence of machining operations on connecting rod blanks to convert the blanks from an original casting to a finished product comprising the steps of:

performing machining operations on a plurality of parts as the parts travel along a predetermined path, the predetermined path defined at least in part by a first path portion extending between a plurality of opposing work stations for partially machining the parts and a second path portion extending generally parallel to said first path portion between the same plurality of opposing work stations for machining partially-machined parts; and recirculating the partially-machined parts from an end of the first path portion to a beginning of the second path portion of the predetermined path.

23. The method of claim 22 further comprising the step of:

moving the parts along the first and second parallel path portions in synchronized, step-wise movement with the parts carried in a generally horizontal position along the first path portion and the recirculated parts carried in a generally vertical position along the second path portion simultaneously between the opposing work stations.

24. The method of claim 22 further comprising the step of:

drilling and tapping bolt-receiving bores in the parts passing through the first path portion.

25. The method of claim 22 further comprising the steps of:

rough machining a first and second bores extending through the parts;

finish machining the first and second bores extending through the parts.

26. The method of claim 22 further comprising the steps of:

carrying said parts between adjacent work stations with carriage means at each work station; and selectively engaging said parts at an upstream work station location and selectively disengaging said parts at a downstream work station location with gripper means carried by said carriage means.

27. The method of claim 26 further comprising the step of:

moving said carriage means between a first position disposed vertically adjacent said work stations, a second position disposed spaced vertically above said work stations, a third position disposed at a first horizontal end limit of movement and a fourth position disposed at a second horizontal end limit of movement.

28. The method of claim 26 further comprising the step of:

reciprocating said carriage means selectively in upstream and downstream directions with respect to said predetermined path of said parts at each work station with drive means.

29. The method of claim 22 further comprising the steps of:

holding at least one part in a generally horizontal first position at each work station along said first path portion with first means; and holding at least one recirculated part in a generally vertical second position at each work station along said second path portion with second means.

30. A method for performing a sequence of machining operations on connecting rod blanks to convert the blanks from an original casting to a finished product comprising the steps of:

performing machining operations on a plurality of parts as the parts travel along a predetermined path, the predetermined path defined at least in part by a first path portion extending between a plurality of opposing work stations for partially machining the parts and a second path portion extending generally parallel to said first path portion for machining partially-machined parts;

recirculating the partially-machined parts from the first path portion to the second path portion of the predetermined path;

carrying said parts between adjacent work stations with carriage means at each work station;

selectively engaging said parts at an upstream work station location and selectively disengaging said parts at a downstream work station location with gripper means carried by said carriage means;

reciprocating said carriage means selectively in upstream and downstream directions with respect to said predetermined path of said parts at each work station with drive means;

supporting said drive means operably engaging with said carriage means, said shuttle means supported for synchronized movement with said carriage means, said drive means including a pinion gear reversibly driven by a motor and a rack connected to the carriage means;

vertically guiding movement of said shuttle means with guide means;

moving said shuttle means vertically with rotary drive means; and connecting said rotary drive means to said shuttle means with translation means for translating rotary motion of said rotary drive means into vertical movement of said shuttle means, wherein said translation means includes the combination of a cam surface and a cam follower connected between the rotary drive means and the shuttle means.

31. A method for performing a sequence of machining operations on connecting rod blanks to convert the blanks from an original casting to a finished product comprising the steps of:

performing machining operations on a plurality of parts as the parts travel along a predetermined path, the predetermined path defined at least in part by a first path portion extending between a plurality of opposing work stations for partially machining the parts and a second path portion extending generally parallel to said first path portion for machining partially-machined parts;

recirculating the partially-machined parts from the first path portion to the second path portion of the predetermined path;

reciprocating a reciprocal piston disposed within a cylinder for movement between first and second end limits of travel, said piston connected to a clamping member for holding at least one of said parts; and following a cam surface connected to said piston with a cam follower engaging said cam surface for driving said piston and connected clamping member in rotation as said piston moves between said first and second end limits of travel.

32. An apparatus for manufacturing connecting rods from blank parts comprising:

first fixture means located at a workstation for receiving at least one part in a first position and for holding said part during a first machining operation;

second fixture means located at said workstation for simultaneously receiving at least one part in a second position and for holding said part during a second machining operation performed simultaneously with said first machining operation, said second position in a non-planar relationship with said first position; and at least one cylinder having a piston for reciprocating along a fixed path between first and second end limits of travel and for rotating a retainer supported by said piston about an axis in response to reciprocation of said piston between a part-releasing position corresponding to said first end limit of movement and a first angular orientation, and a part-retaining position corresponding to said second end limit of travel and a second angular orientation.

33. The apparatus of claim 32 wherein each of said first and second fixture means further comprises:

nest means for receiving and for locating said part in a respective predetermined position; and reciprocal retainer means for releasibly holding said part in said nest means during said respective machining operation.

34. The apparatus of claim 33 wherein said nest means further comprises:

stop means for engaging a surface of said part in a predetermined location;

biasing means for urging said part against said stop means; and locator means for engaging another surface of said part to locate said part in two dimensions in cooperation with said stop means and said biasing means.

35. The apparatus of claim 34 wherein said stop means further comprises:

an adjustable member having a part-engaging surface disposed in said predetermined location.

36. The apparatus of claim 34 wherein said biasing means further comprises:

a pin disposed for reciprocal movement toward and away from said stop means; and a spring urging said pin toward said stop means, so that part engages against said stop means to locate said part in a first direction.

37. The apparatus of claim 34 wherein said locator means further comprises:

a member having at least one locating surface engageable with said part spaced from said stop means for locating said part in a second direction.

38. The apparatus of claim 33 wherein said reciprocal retainer means further comprises:

said retainer releasibly engageable with said part placed in said nest means; and said cylinder connected to said retainer for moving said retainer between said part-releasing position, wherein said retainer is spaced from said nest means, and said part-retaining position, wherein said retainer is adjacent said nest means to hold said part within said nest means.

39. An apparatus for manufacturing connecting rods from blank parts comprising:

first fixture means located at a workstation for receiving at least one part in a first position and for holding said part during a first machining operation;

second fixture means located at said workstation for simultaneously receiving at least one part in a second position and for holding said part during a second machining operation performed simultaneously with said first machining operation, said second position in a non-planar relationship with said first position;

wherein each of said first and second fixture means further includes nest means for receiving and for locating said part in a respective predetermined position, and reciprocal retainer means for releasibly holding said part in said nest means during said respective machining operation, said reciprocal retainer means having a retainer releasibly engageable with said part placed in said nest means, and actuator means connected to said retainer for moving said retainer between a first position, wherein said retainer is spaced from said nest means, and a second position, wherein said retainer is adjacent said nest means to hold said part within said nest means, said actuator means having an actuator moving said retainer along a path of travel between said first and second positions, and means for rotating said retainer about said path of travel as said retainer moves between said first and second positions allowing sufficient clearance for removing said part from said nest means, said actuator having a housing having an elongated aperture formed therein, and a piston reciprocally received within said aperture for movement between first and second end limits of movement.

40. The apparatus of claim 39 wherein said rotating means further comprises:
  a cam surface formed on one of said housing and said piston; and
  a cam follower connected to the other of said housing and said piston, such that said cam follower engages said cam surface as said piston moves between said first and second end limits of travel to drive said piston in rotation about a longitudinal axis of said aperture.

41. An apparatus for manufacturing connecting rods from blank parts comprising:
  a first nest for receiving at least one part in a generally horizontal first position, said first nest including a stop, a biased member opposing said stop and a locator member operably engageable with said part when inserted within said first nest;
  a second nest for receiving at least one part in a generally vertical second position, said second nest including a stop, a biased member opposing said stop and a locator member operably engageable with said part when inserted within said second nest;
  a first retainer for releasably holding said part within said first nest when in a first position, said retainer moveable from said first position to a second position spaced from said first nest allowing removal of an inserted part, said inserted part held in said first nest during a first machining operation;
  a second retainer for releasably holding said part within said second nest when in a first position, said retainer moveable from said first position to a second position spaced from said second nest allowing removal of an inserted part, said inserted part held in said second nest during a second machining operation simultaneous with said first machining operation;
  at least one cylinder having a piston reciprocal between first and second end limits of travel for simultaneously driving said first and second retainer between said first and second positions and for rotating at least one of said first and second retainers in response to movement between said first and second positions allowing sufficient clearance for removal of said part from said nest.

* * * * *